United States Patent
Cavaroc et al.

(10) Patent No.: US 11,697,496 B2
(45) Date of Patent: Jul. 11, 2023

(54) HYBRID SEAWATER BATTERY FOR POWERING AN UNMANNED AERIAL VEHICLE

(71) Applicant: The United States of America as Represented by the Secretary of the Navy, San Diego, CA (US)

(72) Inventors: Peyton B. Cavaroc, Hollywood, SC (US); Jordan Chase McMahan, Ladson, SC (US); Ray Austin Freeman, Ladson, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 269 days.

(21) Appl. No.: 17/121,120

(22) Filed: Dec. 14, 2020

(65) Prior Publication Data
US 2021/0229560 A1 Jul. 29, 2021

Related U.S. Application Data

(60) Provisional application No. 62/949,953, filed on Dec. 18, 2019.

(51) Int. Cl.
*B64C 35/00* (2006.01)
*B60L 53/00* (2019.01)
(Continued)

(52) U.S. Cl.
CPC ............ *B64C 35/001* (2013.01); *B60L 8/003* (2013.01); *B60L 50/60* (2019.02); *B60L 53/00* (2019.02); *B60L 53/51* (2019.02); *B64C 35/006* (2013.01); *B64C 39/024* (2013.01); *B64D 27/24* (2013.01); *H01M 6/34* (2013.01); *H01M 10/465* (2013.01);
(Continued)

(58) Field of Classification Search
CPC ...... H01M 6/34; B64C 35/001; B64C 35/006; B64C 39/024; B64D 27/24; B60L 50/60
See application file for complete search history.

(56) References Cited

U.S. PATENT DOCUMENTS 4,338,384 A * 7/1982 Rouge ..................... H01M 6/34
429/119
5,395,707 A * 3/1995 McCarter ................ H01M 6/34
429/130
(Continued)

FOREIGN PATENT DOCUMENTS

CA    2776768 A1 * 9/2012 ............... C01B 3/08
CN    106898764 A * 6/2017 ............ H01M 4/466
(Continued)

*Primary Examiner* — Michael H Wang
(74) *Attorney, Agent, or Firm* — Naval Information Warfare Center, Pacific; Kyle Eppele; James McGee

(57) ABSTRACT

An unmanned aerial vehicle (UAV) for a remote oceanic environment includes a float system, at least one electric motor, and a seawater battery. The float system allows the UAV to maintain buoyancy on a body of water. The electric motor or motors produce the required lift for the UAV to achieve and maintain flight. The flight includes the UAV landing on the body of water and takeoff from the body of water. The seawater battery directly or indirectly powers the electric motor or motors using seawater from the body of water while the UAV is floating on the body of water.

18 Claims, 1 Drawing Sheet

(51) Int. Cl.
  *B64D 27/24* (2006.01)
  *B60L 50/60* (2019.01)
  *B60L 8/00* (2006.01)
  *B60L 53/51* (2019.01)
  *H01M 6/34* (2006.01)
  *H01M 10/46* (2006.01)
  *H02J 7/35* (2006.01)
  *B64C 39/02* (2023.01)
  *B64U 10/13* (2023.01)
  *B64U 30/20* (2023.01)
  *B64U 50/19* (2023.01)

(52) U.S. Cl.
  CPC ............ *H02J 7/35* (2013.01); *B60L 2200/10* (2013.01); *B64U 10/13* (2023.01); *B64U 30/20* (2023.01); *B64U 50/19* (2023.01); *H01M 2220/20* (2013.01)

(56) References Cited

U.S. PATENT DOCUMENTS

| | | | |
|---|---|---|---|
| 10,054,939 B1* | 8/2018 | Applewhite | ............ B64C 11/28 |
| 10,399,673 B1* | 9/2019 | Roop | ................ B64C 3/30 |
| 2012/0301751 A1* | 11/2012 | Fertman | ............... H01M 6/34 |
| | | | 422/240 |
| 2014/0042975 A1* | 2/2014 | Miller | ............... H01M 50/251 |
| | | | 320/137 |
| 2015/0004457 A1* | 1/2015 | Visco | ............... H01M 6/34 |
| | | | 429/119 |
| 2015/0263354 A1* | 9/2015 | Mazzeschi | ............ F42B 19/24 |
| | | | 429/119 |
| 2019/0039427 A1* | 2/2019 | Hartshorn | ............ B64C 39/024 |
| 2019/0100108 A1* | 4/2019 | Davis | ............... H02J 7/0042 |
| 2021/0001700 A1* | 1/2021 | Fisher | ............... B63G 8/08 |
| 2021/0237868 A1* | 8/2021 | Yamato | ............... B64D 17/80 |

FOREIGN PATENT DOCUMENTS

| | | | | |
|---|---|---|---|---|
| CN | 109071009 A | * | 12/2018 | ............ B64C 1/062 |
| CN | 111268123 A | * | 6/2020 | ............ B64C 35/001 |
| CN | 111954946 A | * | 11/2020 | ............ H01M 10/36 |
| CN | 112498681 A | * | 3/2021 | ............ B60F 5/02 |
| CN | 113224338 A | * | 8/2021 | |

* cited by examiner

HYBRID SEAWATER BATTERY FOR POWERING AN UNMANNED AERIAL VEHICLE

FEDERALLY SPONSORED RESEARCH AND DEVELOPMENT

The United States Government has ownership rights in this invention. Licensing and technical inquiries may be directed to the Office of Research and Technical Applications, Naval Information Warfare Center Atlantic, Code 70F00, North Charleston, S.C., 29419-9022; voice (843) 218-3495; email ssc_lant_T2@navy.mil. Reference Navy Case Number 112202.

BACKGROUND OF THE INVENTION

An unmanned aerial vehicle (UAV) cannot currently be deployed in a remote oceanic environment for extended periods due to the limited life of available batteries. A UAV cannot lift a battery large enough to keep the UAV in operation for a long time interval due to weight limitations.

SUMMARY

An unmanned aerial vehicle (UAV) includes a float system, at least one electric motor, and a seawater battery. The float system allows the UAV to maintain buoyancy on a body of water. The electric motor or motors produce the required lift for the UAV to achieve and maintain flight. The flight includes the UAV landing on the body of water and takeoff from the body of water. The seawater battery directly or indirectly powers the electric motor or motors using seawater from the body of water while the UAV is floating on the body of water.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
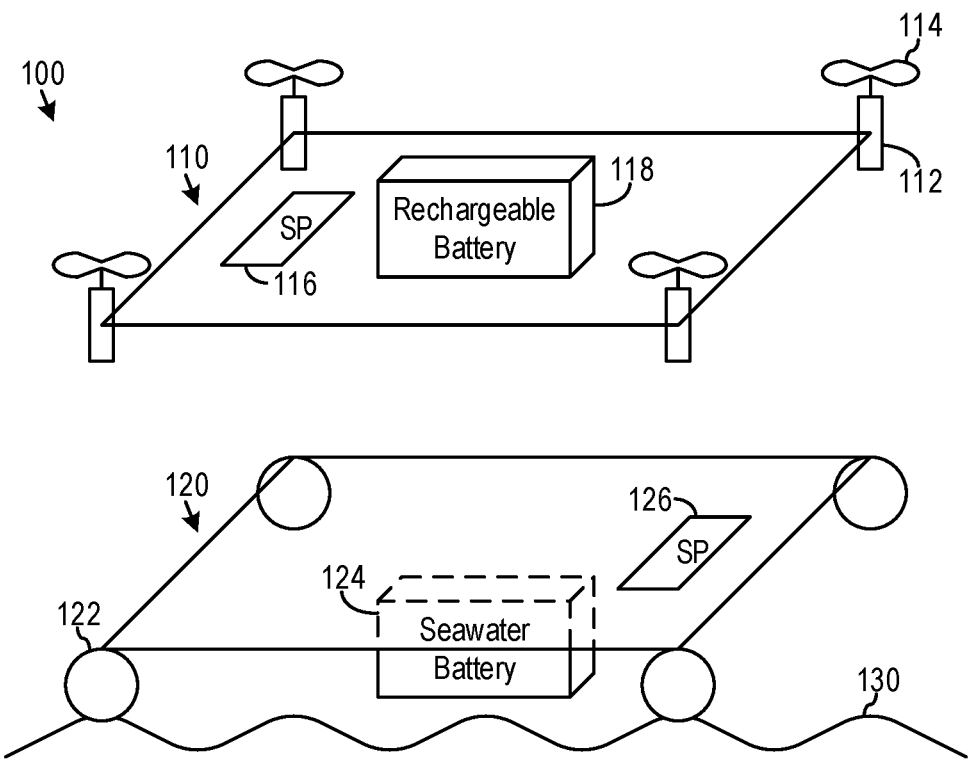
FIG. 1 and FIG. 2 are diagrams of an unmanned aerial vehicle in accordance with an embodiment of the invention.
Figure 2:
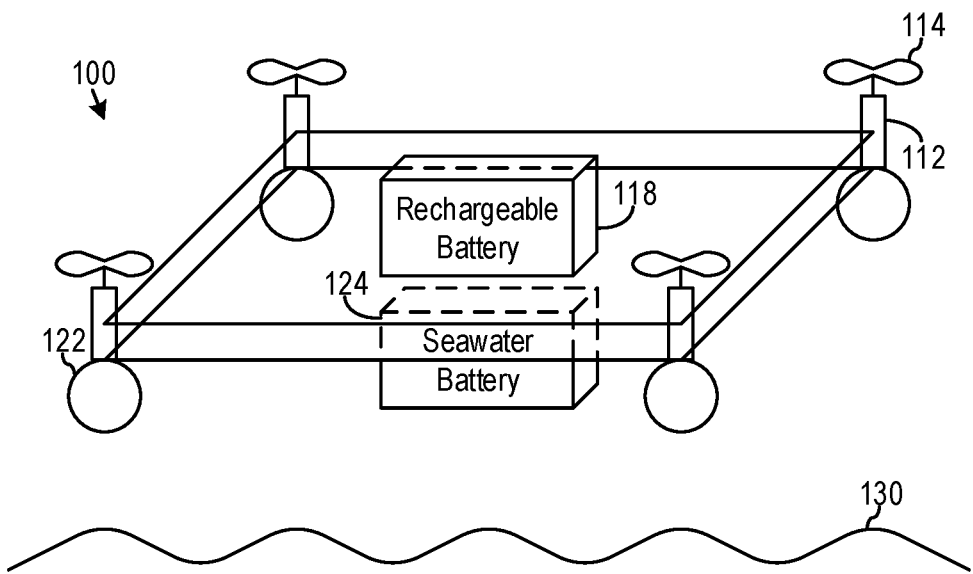

FIG. 1 and FIG. 2 are diagrams of an unmanned aerial vehicle (UAV) in accordance with an embodiment of the invention. FIG. 2 shows the UAV 100 and FIG. 1 shows the UAV 100 when optionally decoupled into a first portion 110 and a second portion 120.

The UAV is capable of extended operation in an oceanic environment. The UAV includes a float system 122 that allows the UAV 100 to maintain buoyancy on a body of water 130. Electric motors 112 drive respective propellers 114 for producing the required lift for the UAV to achieve and maintain flight. This flight includes the UAV 100 landing on the body of water 130 and takeoff from the body of water 130. A seawater battery 124 powers electric motors 112 using seawater obtained from the body of water 130 while the UAV 100 is floating on the body of water 130. The body of water is an ocean or a sea, including an inland body of salty, brackish, or fresh water.

After the landing and before the takeoff, the float system 122 allows the UAV 100 to maintain buoyancy on the body of water 130 with electric motors 112 unpowered. The UAV 100 optionally includes a solar panel 116 or 126 for assisting powering the electric motors 112 and optionally includes a rechargeable battery 118 repeatedly recharged by the seawater battery 124.

In one embodiment, the UAV 100 of FIG. 2 is a unitary UAV 100 and does not include the rechargeable battery 118, and the seawater battery 124 directly powers electric motors 112 in flight using a dose of seawater drawn from the body of water 130. Upon landing on body of water 130, the seawater battery expels the dose of seawater and draws a new dose of seawater from the body of water 130. The expelled dose includes waste products from a chemical reaction between the dose of seawater and a reactant of an electrode of the seawater battery. An energy density of the reactant is greater than an energy density of the rechargeable battery. In a series of takeoffs and landing, the seawater battery expels the old dose of seawater and draws a new dose of seawater upon each landing in the series. Thus, a weight of the seawater battery decreases throughout the series of the landings and the takeoffs.

From the above description of an unmanned aerial vehicle powered by a hybrid seawater battery, it is manifest that various techniques may be used for implementing the concepts of vehicle 100 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that vehicle 100 is not limited to the particular embodiments described herein, but is capable of many embodiments without departing from the scope of the claims.

We claim:

1. An unmanned aerial vehicle (UAV) comprising:
    a float system for allowing the UAV to maintain buoyancy on a body of water;
    at least one electric motor for producing the required lift for the UAV to achieve and maintain flight, wherein the flight includes the UAV landing on the body of water and takeoff from the body of water;
    a seawater battery for powering the at least one electric motor using seawater from the body of water while the UAV is floating on the body of water; and
    a rechargeable battery for powering the at least one electric motor during the flight that includes a series of landings on and takeoffs from the body of water,
    wherein the seawater battery is for repeatedly recharging the rechargeable battery using the seawater from the body of water while the UAV is floating on the body of water after each one of the landings in the series, and
    wherein the seawater battery draws the seawater from the body of water after the one of the landings in the series, and the seawater battery expels the seawater before or during a succeeding one of the takeoffs in the series.

2. The UAV of claim 1, wherein the body of water is an ocean or a sea, which sea includes an inland body of salty, brackish, or fresh water.

3. The UAV of claim 1, wherein the float system is for allowing the UAV to maintain buoyancy on the body of water after the landing and before the takeoff, the at least one electric motor unpowered while the float system is allowing the UAV to maintain buoyancy on the body of water after the landing and before the takeoff.

4. The UAV of claim 1, wherein the seawater battery indirectly powers the at least one electric motor.

5. The UAV of claim 1, wherein the seawater battery includes one or more pairs of electrodes arranged to contact the seawater after the landing and before the takeoff.

6. The UAV of claim 1 further comprising a solar panel for assisting powering the at least one electric motor.

7. The UAV of claim 1 further comprising a solar panel, wherein the solar panel assists directly powering the at least one electric motor during the flight, and the solar panel assists repeatedly recharging the rechargeable battery while the UAV is floating on the body of water with the at least one electric motor unpowered.

8. The UAV of claim 1, wherein a weight of the UAV contacts the seawater with the seawater battery after the one of the landings, and the seawater drains away from the seawater battery during a succeeding one of the takeoffs in the series.

9. The UAV of claim 8, wherein the seawater battery includes a reactant that reacts in at least one chemical reaction with the seawater, and the seawater draining away from the seawater battery carries away waste products from the at least one chemical reaction during the succeeding one of the takeoffs, such that a weight of the seawater battery decreases throughout the series of the landings and the takeoffs.

10. The UAV of claim 1, further comprising:
a plurality of propellers, wherein the at least one electric motor is a plurality of electric motors including a respective electric motor for each of the propellers.

11. The UAV of claim 1, further comprising:
a coupler for joining and decoupling first and second portions of the UAV during the series of the flight, wherein the first portion includes the at least one electric motor and the rechargeable battery, and the second portion includes the float system and the seawater battery.

12. An unmanned aerial vehicle (UAV) comprising:
a float system for allowing the UAV to maintain buoyancy on a body of water;
at least one electric motor for producing the required lift for the UAV to achieve and maintain flight, wherein the flight includes the UAV landing on the body of water and takeoff from the body of water;
a seawater battery for powering the at least one electric motor using seawater from the body of water while the UAV is floating on the body of water; and
a rechargeable battery for powering the at least one electric motor during the flight that includes a series of landings on and takeoffs from the body of water,
wherein the seawater battery is for repeatedly recharging the rechargeable battery using the seawater from the body of water while the UAV is floating on the body of water after each one of the landings in the series,
wherein a weight of the UAV contacts the seawater with the seawater battery after the one of the landings, and the seawater drains away from the seawater battery during a succeeding one of the takeoffs in the series,
wherein the seawater battery includes a reactant that reacts in at least one chemical reaction with the seawater, and the seawater draining away from the seawater battery carries away waste products from the at least one chemical reaction during the succeeding one of the takeoffs, such that a weight of the seawater battery decreases throughout the series of the landings and the takeoffs, and
wherein an energy density of the reactant is greater than an energy density of the rechargeable battery.

13. An unmanned aerial vehicle (UAV) comprising:
a float system for allowing the UAV to maintain buoyancy on a body of water;
at least one electric motor for producing the required lift for the UAV to achieve and maintain flight, wherein the flight includes the UAV landing on the body of water and takeoff from the body of water;
a seawater battery for powering the at least one electric motor using seawater from the body of water while the UAV is floating on the body of water;
a rechargeable battery for powering the at least one electric motor during the flight that includes a series of landings on and takeoffs from the body of water; and
a coupler for joining first and second portions of the UAV, wherein the first portion includes the at least one electric motor and the rechargeable battery, and the second portion includes the float system and the seawater battery,
wherein the seawater battery is for repeatedly recharging the rechargeable battery using the seawater from the body of water while the UAV is floating on the body of water after each one of the landings in the series,
wherein the series of the flight includes the first and second portions being coupled at the coupler and landing on the body of water, and the first portion decoupling from the second portion at the coupler and taking off from the body of water without the second portion, and
wherein the series of the flight further includes the first portion landing back on the second portion on the body of water and coupling to the second portion at the coupler, and the first portion taking off from the body of water either with or without the second portion after the seawater battery recharges the rechargeable battery using the seawater.

14. The UAV of claim 13, wherein the first portion further includes a solar panel for assisting powering the at least one electric motor and, while the first and second portions are coupled at the coupler, for assisting recharging the rechargeable battery.

15. The UAV of claim 13, wherein the second portion further includes a solar panel for assisting recharging the rechargeable battery while the first and second portions are coupled at the coupler.

16. The UAV of claim 13, wherein the seawater battery includes a reactant that chemically reacts with the seawater for recharging the rechargeable battery.

17. The UAV of claim 13, wherein the seawater battery draws the seawater from the body of water after the first portion lands back on and couples to the second portion, and the seawater battery expels the seawater upon the first portion taking off from the body of water either with or without the second portion.

18. The UAV of claim 13, wherein a weight of the first portion contacts the seawater with the seawater battery after the first portion lands back on and couples to the second portion, and the seawater drains away from the seawater battery upon the first portion taking off from the body of water either with or without the second portion.

* * * * *